Patented Nov. 25, 1941

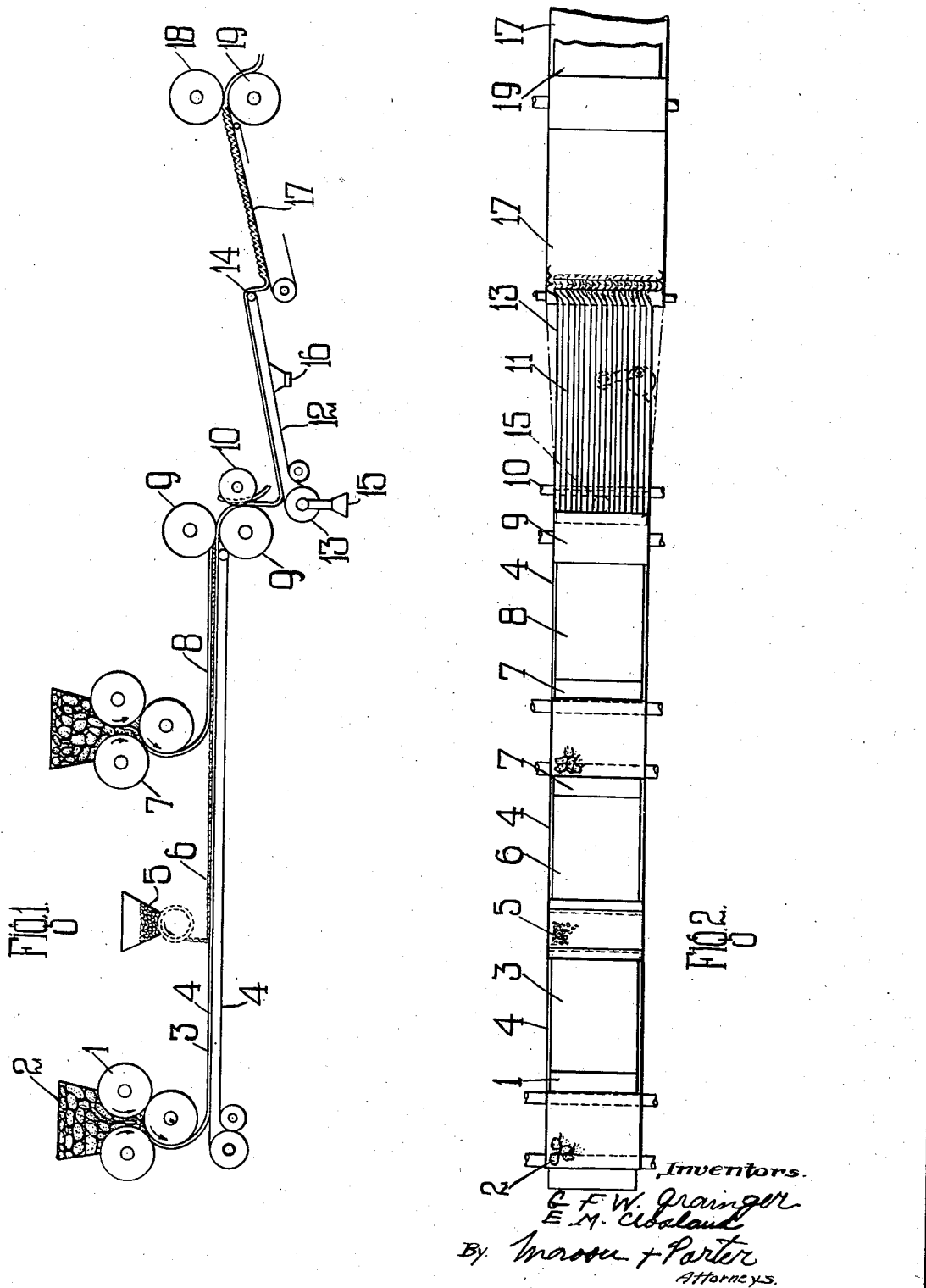

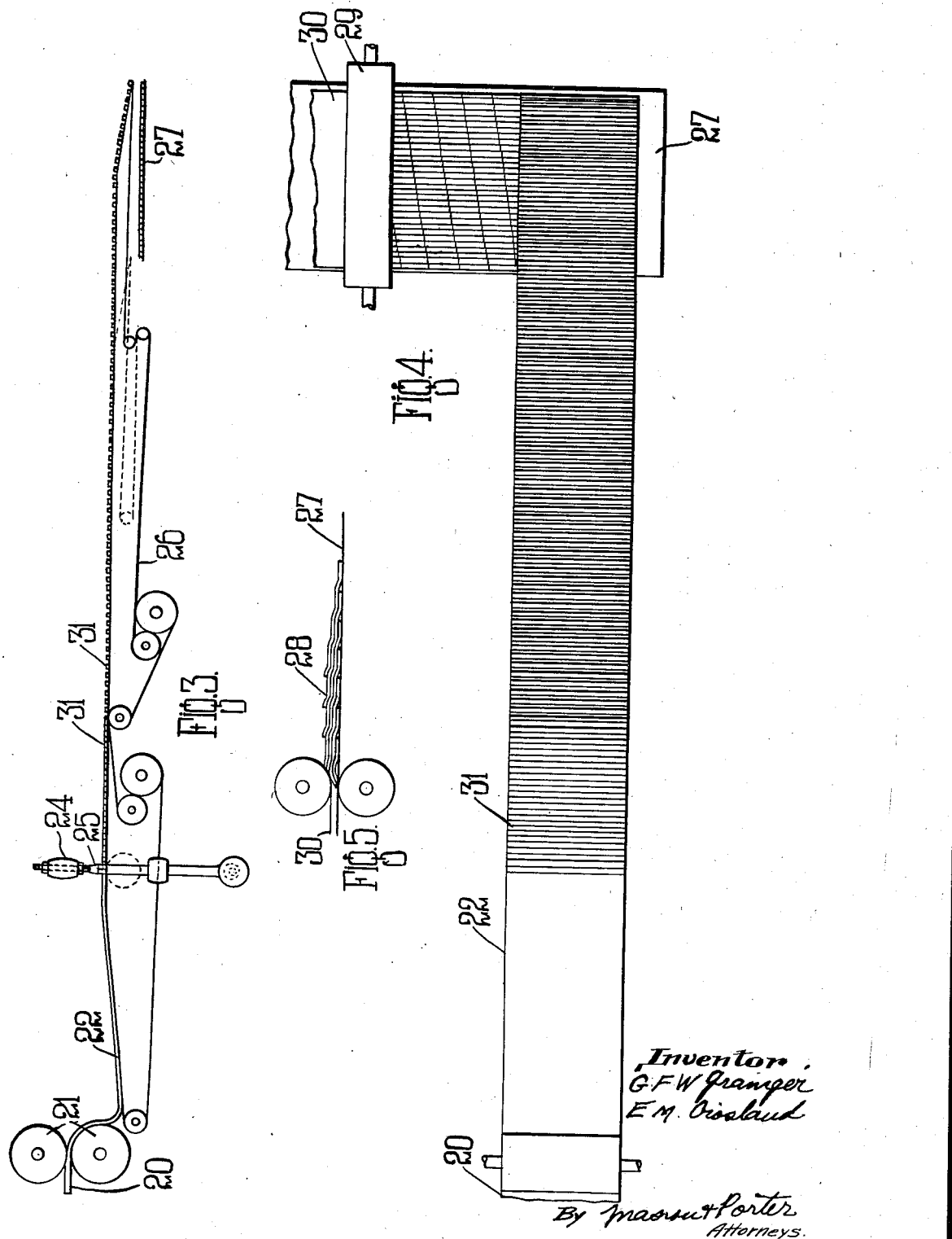

2,264,115

UNITED STATES PATENT OFFICE 2,264,115

METHOD AND APPARATUS FOR TREATING DOUGH

George Frederick William Grainger and Edward Milner Crosland, Earlestown, Newton-le-Willows, England, assignors to T. & T. Vicars Limited, Earlestown, Newton-le-Willows, England, a British company Application March 25, 1940, Serial No. 325,920
In Great Britain January 14, 1939

7 Claims. (Cl. 107—54)

The present invention relates to improvements in the manufacture of biscuits and the like dough products.

In the manufacture of dough for the baking of biscuits, bread, cakes and the like it has been customary to pass the roll through a brake, then by hand to lap the dough upon itself, and feed this through as a wad or thickened layer at right angles to its previous direction.

To give the final product a laminated character it is usual to spread flour or granulated fat, or both, on to the sheet of dough before the lapping takes place. If, after passing through the brake rollers, the dough is folded over itself three times and then reduced again and folded a further three times, and this process is again repeated, there will be, in effect, 27 folds in the final sheet, and these folds will have been rolled both ways so that the texture of the dough shall be in flakes and not in strings.

It will be appreciated, however, that this is a discontinuous operation, and that with the high speed of continuous biscuit and cake machinery, it has not been possible to normally prepare dough in this manner. In such machines it has therefore been usual to pass the dough from a hopper through a two-roll or multi-roll sheeter and then through one or more pairs of gauging rollers continuously, but although this gave a rapid and continuous feed to the machine, yet the dough had an unbroken and continuous grain, and it is not possible to satisfactorily make many classes of biscuits of a flaky texture.

In order to avoid this disadvantage and with a view to providing a laminated sheet of dough, and yet give a continuous feed, it has been proposed to feed a dough sheet or strip from a sheeter disposed at right angles to the conveyor, so that the sheet falling by gravity was lapped over upon itself continuously as a flattened helix.

According to the present invention, a continuous sheet of dough made by a sheeting machine or preferably two continuous sheets made by a sheeting machine having a coating of flour, granulated fat, flavoring, etc., in between, so as to form a sandwich, are reduced in thickness to a very fine gauge and split lengthwise into narrow ribbons.

The invention is more particularly described with reference to the accompanying drawings, in which:

Figure 1 is a diagrammatic side elevation of one arrangement for carrying out the present invention.

Figure 2 is a corresponding plan view.

Figure 3 is a diagrammatic side elevation of a modified form of construction.

Figure 4 is a corresponding plan view.

Figure 5 is a corresponding partial end view.

A dough sheet forming apparatus 1 is shown as having three rollers which reduce dough placed in the hopper 2 to sheet form as shown at 3. Any other known type of sheet forming apparatus may, however, be used.

A conveyor web 4 carries the sheet of dough 3 underneath an apparatus 5 for distributing suitable material, such as fat, flour, flavoring or the like, on top of the sheet. Any known type of distributor may be used for this purpose.

The dough sheet 3 with a layer of flour or fatty material, passes underneath sheeter 7 which may be the same as sheeter 1. This sheeter 7 produces a sheet of dough 8 which is laid on top of the sheet 3 and with the material 6 in therebetween, there is formed a sandwich. This sandwich is then passed between rollers 9 to reduce the sandwich into a thin sheet. Only one pair of rollers is shown, but it may be necessary to use two or more pairs so as to reduce the sheet down to the required thickness. Rotary cutters 10 contacting with gauging roller 9 show one method of reducing the thin sheet of material into narrow strips. The division into strips may be done in many ways, such as passing between fluted rollers or by cutters acting on the dough while it is supported by the table. The strips of dough 11 are received on conveyor band 12. This conveyor band is shown as being driven by roller 13 having a delivery roller 14. The shaft of roller 13 is supported on pivots in a bracket 15, while a vertical crank pin 16 is connected to the whole conveyor to oscillate it about its pivots on the bracket 15. The strips of dough from conveyor 12 are delivered on to a wider conveyor 17 which runs at a reduced speed compared with conveyor 12. The action of delivering the dough in strips with an oscillating movement to a slow moving conveyor is to distribute the strips substantially in a direction at right angles to the direction of travel.

By varying the speed of conveyor 17 in relation to conveyor 12, the depth of the mass of overlaid strips can be varied and the number of laminations produced by the overlaying strips can be arranged to suit requirements.

The pile of strips on conveyor 17 is fed through rollers 18 where the mass is reduced to a sheet 19 which by subsequent rolling can be reduced to a sheet of a thickness suitable for making a biscuit.

In the alternative arrangement shown in Figures 3 to 5, the sandwiched sheet of dough 20 passes through reducing rollers 21 to form a thin sheet 22. A conveyor 23 carries this sheet 22 under a cutter crosshead 24 which gives a reciprocating motion to a knife 25 to cut the sheet into strips 31 across the machine.

A further conveyor 26 running at a higher speed spreads out the strips. In addition to normal movement of the conveyor 26, the delivery end thereof has a reciprocatory motion so that in working on the backward stroke the cut strips are deposited on to a conveyor 27 running at right angles to the conveyor 26. As the conveyor 27 is running at a slow speed the strips are laid overlapping one another as shown at 28 building up a thick layer which is reduced to a sheet 30 by gauging rollers 29.

If desired the flour, fat or the like may be distributed between individual layers formed of groups of bars or ribbons.

In the arrangement shown, the bars and ribbons lie substantially parallel to one another, but it is obvious that groups of bars or again the whole lap formed of a plurality of ribbons or groups of ribbons may be laid wholly or partially over other groups, either at a right angle or at an angle less than a right angle.

We declare that what we claim is:

1. A machine for the manufacture of a sheet of dough suitable for the making of bakery products, consisting of means to form a continuous sheet from dough lumps, means to cut said dough sheet continuously into strips, rolls adapted to convert strips fed thereto into a continuous sheet, and a conveyor between said sheet cutting means and said rolls and said conveyor travelling at a lower peripheral speed than the strips to receive said strips in overlapping relationship and to feed the layer so formed to said rolls.

2. A machine for the manufacture of a sheet of dough to be subsequently formed into a bakery product, consisting of a continuous sheeter, a distributor for laying a layer of material on the dough, a conveyor conveying said sheet of dough past said distributor, a second sheeter adapted to lay a second sheet of dough thereon to form a sandwich, rolls to reduce the thickness of said sandwich, cutting means to slit said sheeted sandwich into a plurality of ribbons, means to oscillate said plurality of ribbons to and fro, a second means for converting a thick layer formed of ribbons to a sheet, and a second conveyor between said cutting means and said converting means moving at a slower speed than said ribbons so that said ribbons come into overlapped relationship thereon.

3. A method for the preparation of dough for the making of bakery products such as biscuits, consisting in forming the dough into a plurality of strips, arranging said strips with at least portions thereof in overlapping relationship to form a thickened layer, and compressing said thickened layer to form a sheet of reduced thickness.

4. A method for the preparation of dough for the making of bakery products such as biscuits, consisting in forming a continuous web of dough, applying a layer of coating material to the web dough, applying a second web of dough over the coating layer on the first web of dough to form a continuous composite dough sheet, cutting the dough sheet into a plurality of relatively narrow ribbon strips, arranging said strips with at least portions thereof in overlapping relationship during continuous movement thereof to form a thickened layer, and rolling the resultant thickened layer into a continuous thinner sheet.

5. A method for the preparation of dough for the making of bakery products such as biscuits, consisting in forming the dough into a plurality of separate strips, laying a group of said strips at least partially over another group of said strips to form a thickened layer and compressing said thickened layer to form a sheet.

6. A method for the preparation of dough for the making of bakery products such as biscuits, consisting in forming a web of dough, cutting the web of dough into a plurality of relatively short separate strips lying in a common plane, laying groups of said strips in at least partially overlapping relationship with respect to other groups of said strips and at an angle thereto in order to form a thickened layer, and compressing said thickened layer to form a continuous sheet.

7. A method for the preparation of dough for the making of bakery products such as biscuits, consisting in forming a continuous sheet of dough, applying thereto a coating layer, forming a second continuous sheet of dough, laying said second sheet of dough continuously over the coating layer on said first sheet of dough to form a composite dough sheet, continuously rolling the composite dough sheet, slitting the composite dough sheet into a plurality of strips, oscillating the strips laterally, moving the oscillated strips at a slower speed than the speed of travel of the composite dough sheet to form a thickened layer with the strips at least partially overlapping each other, and rolling the thickened layer to provide a continuous dough sheet of reduced thickness.

GEORGE FREDERICK WILLIAM GRAINGER.
EDWARD M. CROSLAND.